United States Patent
Daigo et al.

(10) Patent No.: US 10,056,774 B2
(45) Date of Patent: Aug. 21, 2018

(54) DISCHARGE DEVICE

(71) Applicant: Mitsubishi Electric Corporation, Tokyo (JP)

(72) Inventors: Toru Daigo, Tokyo (JP); Nobuhiro Kihara, Tokyo (JP); Yuji Kuramoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 61 days.

(21) Appl. No.: 15/107,619

(22) PCT Filed: Feb. 6, 2014

(86) PCT No.: PCT/JP2014/052736
§ 371 (c)(1),
(2) Date: Jun. 23, 2016

(87) PCT Pub. No.: WO2015/118636
PCT Pub. Date: Aug. 13, 2015

(65) Prior Publication Data
US 2016/0329733 A1 Nov. 10, 2016

(51) Int. Cl.
*H02J 7/00* (2006.01)
*H02M 1/34* (2007.01)

(52) U.S. Cl.
CPC .......... *H02J 7/0068* (2013.01); *H02J 7/0072* (2013.01); *H02M 1/34* (2013.01); *H02M 2001/344* (2013.01)

(58) Field of Classification Search
CPC .............. H02J 7/0031; H02J 2007/004; H02J 2007/0037; Y02E 60/12; H01M 10/48
(Continued)

(56) References Cited

U.S. PATENT DOCUMENTS 5,517,397 A * 5/1996 Quek ................. H02M 3/33507
363/21.16
5,666,257 A * 9/1997 Yang .................... H01H 33/596
361/139

(Continued)

FOREIGN PATENT DOCUMENTS

JP 2002-325464 A 11/2002
JP 2003-319661 A 11/2003
(Continued)

OTHER PUBLICATIONS

International Search Report of PCT/JP2014/052736 dated Apr. 15, 2014.

*Primary Examiner* — Arun Williams
(74) *Attorney, Agent, or Firm* — Sughrue Mion, PLLC; Richard C. Turner

(57) ABSTRACT

A discharge device provided with a switching unit configured by a first switch element and a second switch element connected in series, a first power storage element connected in parallel with both ends of the switching unit, a second power storage element connected in parallel with both ends of the second switch element, and a control unit which controls on/off switching of the first switch element and the second switch element in such a manner that a portion of the energy charged in the first power storage element is charged and discharged at least once by the second power storage element, and the energy charged in the first power storage element is discharged while being consumed in one or all of the first switch element and the second switch element.

14 Claims, 4 Drawing Sheets

(58) Field of Classification Search
USPC .......................................................... 320/134
See application file for complete search history.

(56) References Cited

U.S. PATENT DOCUMENTS

| | | | | |
|---|---|---|---|---|
| 2002/0140397 | A1* | 10/2002 | Hasegawa | H02J 7/1423 |
| | | | | 320/104 |
| 2002/0159281 | A1 | 10/2002 | Furukawa et al. | |
| 2003/0025483 | A1* | 2/2003 | Neidlinger | H05B 41/2825 |
| | | | | 323/288 |
| 2003/0062874 | A1* | 4/2003 | Furukawa | H02J 7/0016 |
| | | | | 320/121 |
| 2004/0051534 | A1* | 3/2004 | Kobayashi | G01R 19/16542 |
| | | | | 324/429 |
| 2006/0092583 | A1* | 5/2006 | Alahmad | H02J 7/0024 |
| | | | | 361/15 |
| 2007/0118030 | A1* | 5/2007 | Bruce | A61B 5/0031 |
| | | | | 600/347 |
| 2008/0203087 | A1 | 8/2008 | Schilling et al. | |
| 2012/0235665 | A1* | 9/2012 | Buiatti | G05F 1/67 |
| | | | | 323/311 |
| 2014/0266091 | A1* | 9/2014 | Zuniga | H02M 3/156 |
| | | | | 323/271 |
| 2015/0022928 | A1* | 1/2015 | Mohaddes Khorassani | H02H 3/087 |
| | | | | 361/93.7 |

FOREIGN PATENT DOCUMENTS

| | | |
|---|---|---|
| JP | 2006-042459 A | 2/2006 |
| JP | 2009-512147 A | 3/2009 |
| JP | 2010-206108 A | 9/2010 |
| JP | 2011-078194 A | 4/2011 |

* cited by examiner

DISCHARGE DEVICE

CROSS REFERENCE TO RELATED APPLICATIONS

This application is a National Stage of International Application No. PCT/JP2014/052736 filed Feb. 6, 2014, the contents of which are incorporated herein by reference in their entirety.

TECHNICAL FIELD

This invention relates to a discharge device for a power storage element which is connected in parallel to a switch element that is driven by receiving a control signal.

BACKGROUND ART

An inverter, or the like, which controls a motor switches a current supply path flowing from a power source to the coils of the motor, by controlling a switching device, thereby controlling the driving of the motor. Furthermore, by controlling the switching device, a transformer, or the like, adjusts the amount of current supplied from the power source to the reactor (coil), and the voltage generated by the power source is converted to an arbitrary voltage and output.

As a specific configuration of the switching device, a first switch element and a second switch element are connected in series, and furthermore, the contact point of the first switch element and the second switch element is connected to a reactor, which is an output section. In order to smoothen variations in the power source in the first switch element and the second switch element which are connected in series, a power storage element is connected in parallel, and driving of the motor is controlled and current is supplied by controlling the switching device. In order to discharge the energy that has been collected in the power storage element when power storage is not required, a discharge device is required.

A method in which a discharge resistor is connected to the power storage element is given as a discharge device of this kind. However, constantly passing current through the discharge resistor leads to the generation of heat in the resistor, and decline in the efficiency of the inverter. Therefore, a method is adopted in which the switch elements, and the like, are connected in series with the discharge resistor, and discharge is started by passing current through the switch elements by a discharge signal that is output only when discharge is required. Furthermore, a method for determining whether or not to output a discharge signal by detecting variation in the voltage between the two ends of a capacitor by a differential circuit has been proposed (see, for example, Patent Document 1).

CITATION LIST

Patent Literature

[PTL1]
Japanese Patent Application Publication No. 2006-042459
[PTL2]
WO 2011/016199

SUMMARY OF INVENTION

Technical Problem

However, the prior art involves the following problems.
Firstly, the relationship between the current passed through a switch element and the power storage element for smoothening power source variations will be described. Since the energy variation becomes greater, the larger the current passed through the switch element, then the power variation also becomes greater. In order not to transmit the energy variation to the power source, a power storage element provided with a capacity for accepting energy variation is required. Therefore, the greater the current passed through the switch element, the larger the capacity of the power storage element in order to smoothen the power source variation, and the greater the energy charged to the power storage element.

In the discharge device shown in Patent Document 1, when the energy charged in the power storage element is large, then a large current is passed through the discharge resistor during discharge, and the amount of heat generated in the discharge resistor becomes large. As a result of this, the temperature of the discharge resistor and the temperature inside the case of the discharge device rise due to the generation of heat in the discharge resistor, and there is a problem in that the maximum allowable temperature of the components constituting the discharge device including the discharge resistor will be exceeded. Moreover, a problem also occurs in that a heat radiating device for radiating the heat generated by the discharge resistor must be made large in size.

A current only passes through the discharge resistor when the switch element is on. Therefore, in order to suppress the amount of heat generated in the discharge resistor, it is also possible to control the on/off switching of the switch element connected in series to the discharge resistor, and to restrict the amount of current passing through the discharge resistor, thus reducing the amount of heat generated. However, since the power is the product of the resistance and the square of the current, then the discharge resistor generates heat in direct proportion to the square of the current.

Therefore, when the current is large, then the discharge resistor becomes hot even if current is passed for a short period of time. In order to prevent high temperatures, it is necessary to control at high speed the on/off switching of the switch element which is connected in series to the discharge resistor, in accordance with the energy charged in the power storage element. As a result of this, in order to achieve high-speed control of the switch element, it is necessary to use an expensive high-performance control IC, and there is a problem in that costs become high.

For example, during normal operation for driving the motor, the inverter is used in a state in which the power storage element has been charged with energy. Therefore, discharging of the power storage element is carried out at times other than normal operation, for instance, when the motor has been stopped and the inverter (power storage element) has been disconnected from the main power source. Therefore, in an inverter which controls a motor at low speed, although it is possible to control the motor sufficiently with an inexpensive low-speed control IC during normal operation, nevertheless, an expensive high-performance control IC must still be used in order to discharge the power storage element only.

The present invention was devised in order to resolve problems such as the foregoing, an object thereof being to obtain a discharge device which can discharge energy stored in a power storage element, by controlling on/off switching of a relatively low-speed switch element which is compatible with a control IC of relatively low performance, even if the current passed through the switch element is large and the energy stored in the power storage element for smoothening the power source variations is large.

Solution to Problem

The discharge device according to the present invention comprises: a switching unit configured including a first switch element and a second switch element which are connected in series; a first power storage element connected in parallel with both ends of the switching unit in which the first switch element and the second switch element are connected in series; a second power storage element connected in parallel with both ends of the second switch element, which is a portion of the switching unit; and a control unit controlling on/off switching of the first switch element and the second switch element, the discharge device discharging energy charged in the first power storage element, wherein the control unit controls on/off switching of the first switch element and the second switch element, in such a manner that a portion of the energy charged in the first power storage element is charged and discharged at least once by the second power storage element, and the energy charged in the first power storage element is discharged while being consumed by one or all of the first switch element and the second switch element.

Advantageous Effects of Invention

According to the discharge device of the present invention,
by adopting a method wherein the on/off switching of the first switch element and the second switch element is controlled in such a manner that a portion of the energy charged in the first power storage element is charged and discharged at least once by the second power storage element, and the energy charged in the first power storage element is discharged while being consumed by one or all of the first switch element and the second switch element,
it is possible obtain a discharge device which can discharge energy stored in a power storage element, by controlling on/off switching of a relatively low-speed switch element which is compatible with a control IC of relatively low performance, even if the current passed through the switch element is large and the energy stored in the power storage element for smoothening the power source variations is large.

DESCRIPTION OF EMBODIMENTS

Figure 1:
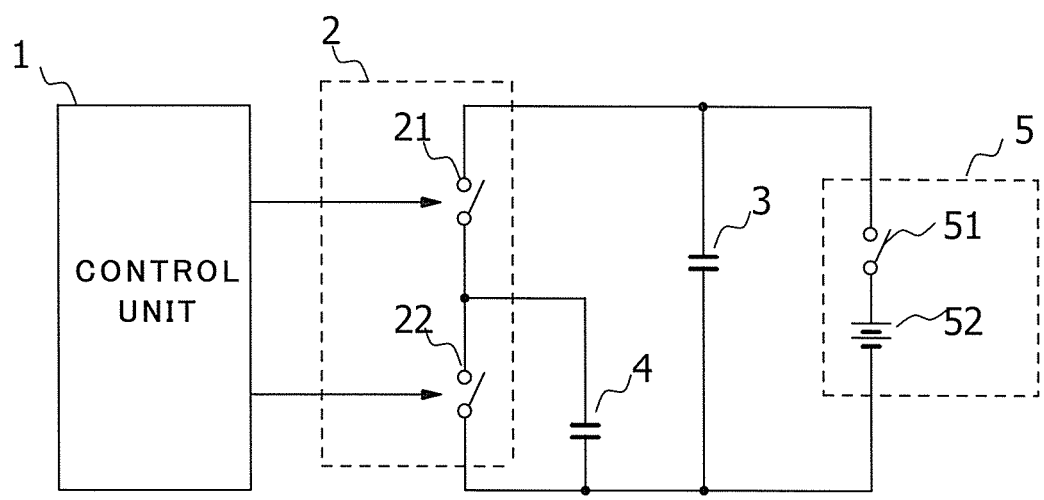
FIG. 1 is a circuit diagram showing an example of a discharge device relating to a first embodiment of the present invention.

Below, a preferred embodiment of a discharge device according to the present invention is described below with reference to the drawings. In the drawings, portions which are the same or equivalent are labelled with the same reference numerals.

First Embodiment

FIG. 1 is a circuit diagram showing an example of a discharge device relating to a first embodiment of the present invention. The discharge device according to the first embodiment is configured by a control unit 1, a switching unit 2, a first power storage element 3 and a second power storage element 4, which have the same capacity, and a power source device 5. Here, the switching unit 2 is configured by connecting the first switch element 21 and the second switch element 22 in series. Furthermore, the power source device 5 is configured by connecting a switch element 51 and a power source 52 in series.

As shown in FIG. 1, the first power storage element 3 is connected in parallel to each of the switching unit 2, in which the first switch element 21 and the second switch element 22 are connected to each other in series, and the power source device 5, in which the switch element 51 and the power source 52 are connected to each other in series. On the other hand, the second power storage element 4 is connected in parallel to the second switch element 22.

In a circuit configuration of this kind, the following state is presupposed.
　The first power storage element 3 has been charged with energy by the power source device 5, and is disconnected from the positive terminal of the power source 52 by the switch element 51.
　The second power storage element 4 is empty of energy.
　The switching unit 2 receives a control signal from the control unit 1 and the first switch element 21 is off and the second switch element 22 is on.

The discharge device of the first embodiment executes a discharge process by steps 1 to 3 indicated below, from the presumed state of this kind.
(Step 1)
Firstly, the switching unit 2 receives a control signal from the control unit 1, and switches the first switch element 21 from off to on, and the second switch element 22 from on to off. As a result of this, the first power storage element 3 and the second power storage element 4 are connected in series via the first switch element 21.

In this case, since the energy charged in the second power storage element 4 is empty, then the energy charged in the first power storage element 3 is charged to the second power storage element 4, in accordance with the empty portion of the second power storage element 4. In other words, a portion of the energy charged in the first power storage element 3 is charged to the second power storage element 4, until the potential difference between the first power storage element 3 and the second power storage element 4 reaches equilibrium.

The first power storage element 3 and the second power storage element 4 have the same capacity, and therefore when the potential difference therebetween is in equilibrium, the same amount of energy is charged in the first power storage element 3 and the second power storage element 4. Therefore, half of the energy originally charged in the first power storage element 3 remains in the first power storage element 3, and the remaining half is charged to the second power storage element 4.

In actual practice, there is loss due to the on resistance of the first switch element 21, and the energy divided between the first power storage element 3 and the second power storage element 4 is the energy originally charged in the first power storage element 3, minus the thermal energy generated by the on resistance of the first switch element 21. In other words, the sum of the energy charged in the first power storage element 3 and the second power storage element 4 is smaller than the energy that was charged in the first power storage element 3 originally, prior to step 1.

(Step 2)

Thereupon, the switching unit 2 receives a control signal from the control unit 1, and switches the first switch element 21 from on to off, and the second switch element 22 from off to on. As a result of this, the first power storage element 3 and the second power storage element 4 are disconnected, and the second power storage element 4 is shorted via the second switch element 22.

In this case, the energy charged in the second power storage element 4 is discharged. In other words, energy of a quantity less than the energy charged in the first power storage element 3 prior to step 1 is discharged from the second power storage element 4.

(Step 3)

Next, the switching unit 2 receives a control signal from the control unit 1, and switches the first switch element 21 from off to on. As a result of this, the first power storage element 3 and the second power storage element 4 are both shorted.

In this case, the energy charged in the first power storage element 3 is discharged. In other words, energy of a quantity less than the energy charged in the first power storage element 3 prior to step 1 is discharged from the first power storage element 3.

By repeating steps 1 and 2, the energy charged in the first power storage element 3 is divided into energy that is charged to the second power storage element 4, and the energy charged to the second power storage element can be discharged.

Here, the total loss in the first switch element 21 will be described.

Figure 2:
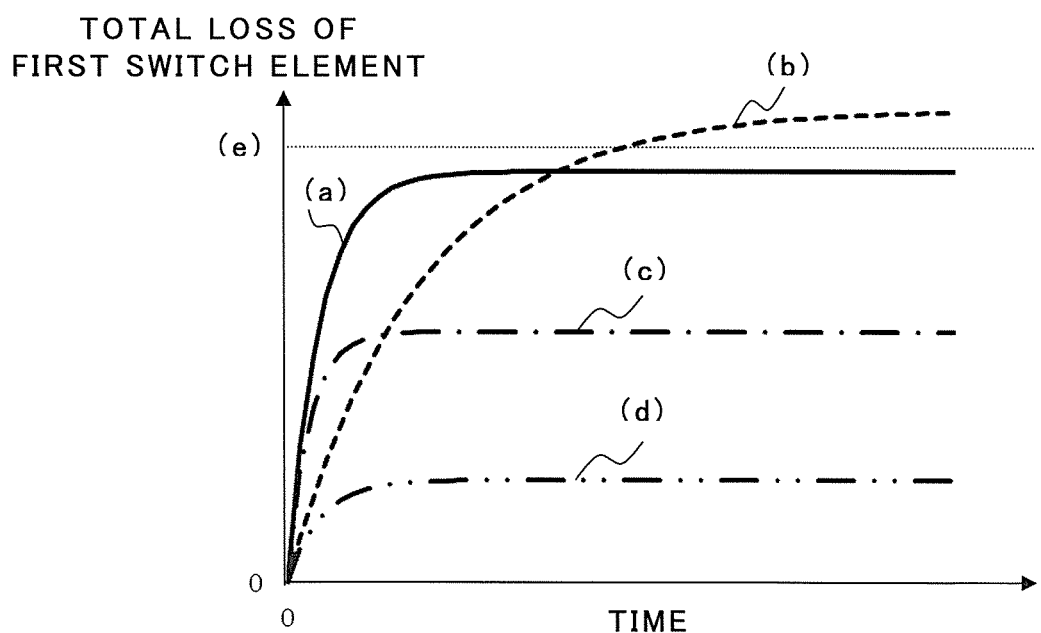
FIG. 2 is a diagram showing a time response waveform of the total loss of a first switch element according to the first embodiment of the present invention.

FIG. 2 is a diagram showing a time response waveform of the total loss of the first switch element 21 according to the first embodiment of the present invention. In FIG. 2, the horizontal axis represents time and the vertical axis represents the total loss of the first switch element 21. Furthermore, (a), (b) and (e) shown in FIG. 2 respectively the contents indicated below. (b) and (c) are described further below.

(a) is the total loss of the first switch element 21 according to the first embodiment.

(b) is the total loss of the first switch element 21 when consuming energy that has been charged to the first power storage element 3 prior to step 1, in the event of an arm short-circuit when the first switch element 21 and the second switch element 22 are switched on.

(e) is the maximum allowable loss in the maximum allowable amount of generated heat in the first switch element 21.

Heat generation T[° C.] is indicated by Formula (1) below, using the heat resistance Rth[Ω] and the loss Ploss[W].

$$T = Rth \times Ploss \qquad (1)$$

If the thermal resistance is uniform, then the maximum allowable loss in the maximum allowable heat generation amount can be determined easily from Formula (1) above.

In step 1, a portion of the energy charged in the first power storage element 3 is charged to the second power storage element 4, until the voltages of the first power storage element 3 and the second power storage element 4 are uniform. In this case, the first switch element 21 produces loss due to the current passing through the first switch element 21 and the on resistance of the first switch element 21, and hence generates heat.

When an arm short-circuit occurs as shown in (b), the first switch element 21 generates loss equal to or exceeding (e), the maximum allowable heat generation amount is exceeded, and therefore the first switch element 21 breaks down. On the other hand, in the case of the first embodiment, since the energy of the first power storage element 3 is discharged to the second power storage element 4, then because the first power storage element 3 and the second power storage element 4 are connected in series in step 1, then the voltage falls. On the other hand, since the energy of the first power storage element 3 is charged to the second power storage element 4, then the voltage rises. Consequently, the potential difference between the first power storage element 3 and the second power storage element 4 is reduced.

In this way, since the potential difference between the first power storage element 3 and the second power storage element 4 is reduced, then the amount of movement of energy between the first power storage element 3 and the second power storage element 4 is small, and the current passing through the first switch element 21 also becomes smaller. As a result of this, the loss occurring in the first switch element 21 due to the current passing through the first switch element 21 and the on resistance of the first switch element 21 is reduced, and the total loss becomes (a), which does not exceed (e). Therefore, in step 1, the first switch element 21 does not break down.

Furthermore, in step 2, the energy discharged from the second power storage element 4 is less than the energy that was charged in the first power storage element 3 prior to step 1. Consequently, the total loss of the second switch element 22 does not exceed (e) and hence the second switch element 22 does not break down.

Similarly, the energy discharged in step 3 is less than the energy that was charged in the first power storage element 3 prior to step 1. Consequently, the total loss of the first switch element 21 and the second switch element 22 does not exceed (e) and hence the first switch element 21 and the second switch element 22 do not break down.

Figure 3:
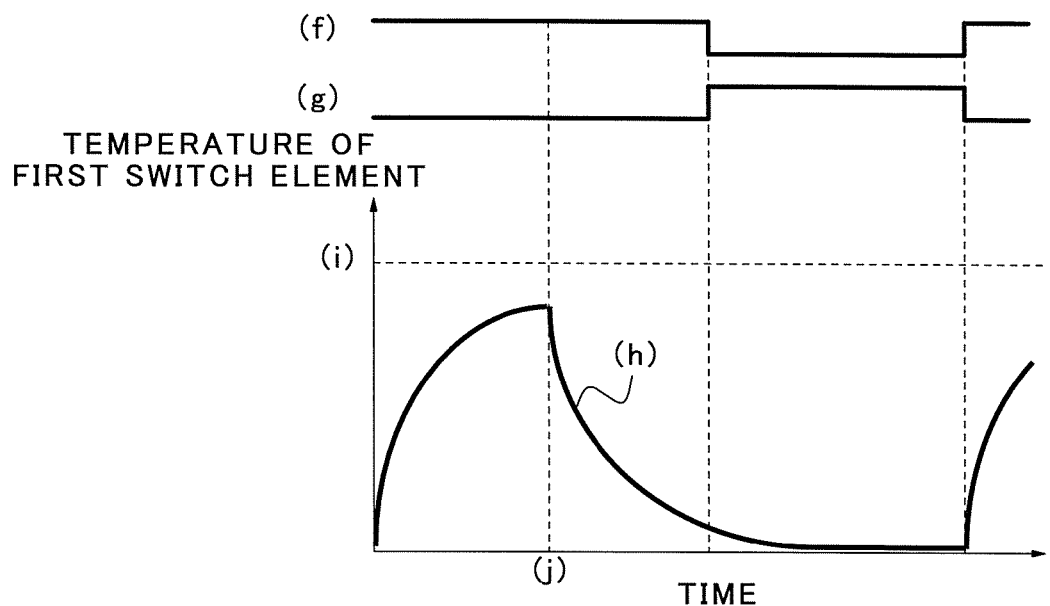
FIG. 3 is a diagram showing the control signal of a switching unit, and a time response waveform of the temperature of the first switch element according to the first embodiment of the present invention.

Next, the control signals from the control unit 1 which are input to the switching unit 2, and the charging of the second power storage element 4, will be described. FIG. 3 is a diagram showing the control signals of the switching unit 2, and a time response waveform of the temperature of the first switch element 21 according to the first embodiment of the present invention. In FIG. 3, the horizontal axis represents time and the vertical axis represents the temperature of the first switch element 21. Furthermore, (f) to (j) shown in FIG. 3 respectively show the following contents.

(f) shows the variation over time of the on/off state of the control signal from the control unit 1 which is input to the first switch element 21. When this control signal (f) is on, then the first switch element 21 switches on, and when the control signal (f) is off, then the first switch element 21 switches off.

(g) shows the variation over time of the on/off state of the control signal from the control unit 1 which is input to the second switch element 22. When this control signal (g) is on, then the second switch element 22 switches on, and when the control signal (g) is off, then the second switch element 22 switches off.

(h) indicates the temperature of the first switch element 21.

(i) indicates the maximum rated temperature of the first switch element 21.

(j) indicates the time at which the first switch element 21 reaches the temperature of maximum total loss.

When the control signal (f) is on in step 1, then the first switch element 21 is on. Therefore, the energy charged in the first power storage element 3 is charged to the second power storage element 4. In this case, the movement of energy from the first power storage element 3 to the second power storage element 4 ends when the potential of the first power storage element 3 and the potential of the second power storage element 4 reach equilibrium. Therefore, even if the first switch element 21 exceeds the time (j) and continues in an on state, movement of energy does not occur.

Furthermore, since movement of energy does not occur when the time (j) is exceeded, then the temperature gradually declines during the on period of the control signal (f) after exceeding the time (j), and during the off period of the control signal (f) in step 2. As a result of this, the temperature of the first switch element 21 does not exceed the maximum rated temperature (i).

In step 2, when the control signal (g) is on, then the energy of the second power storage element 4 is discharged and in step 3, the temperature of the first switch element 21 rises again. However, the energy discharged in step 3 is less than the energy that was charged in the first power storage element 3 prior to step 1. As a result of this, the temperature of the first switch element 21 does not exceed the maximum rated temperature (i), even in step 3.

Consequently, it is possible to prevent the first switch element 21 from breaking down as a result of the generation of heat due to the current passing through the first switch element 21 and the on resistance of the first switch element 21. In other words, the control signal (f) may be switched on for a period of time equal to or greater than that during which energy is charged to the second power storage element 4 (in other words, a time period equal to or greater than the time period (j) in FIG. 3).

In this way, even if the current passing through the switching unit 2 is large and the energy stored in the first power storage element 3 in order to smoothen the power source variation is large, it is still possible to obtain the following effects by implementing switching control of the switching unit 2 by the control unit 1 in accordance with steps 1 to 3.

Effect 1

In step 1 when only the first switch element 21 is switched on, provided that the voltage of the first power storage element 3 and the voltage of the second power storage element 4 are in equilibrium, then even if the on state of the first switch element 21 continues thereafter, movement of energy from the first power storage element 3 to the second power storage element 4 does not occur. As a result of this, the time period from the start of step 1 until transfer to step 2 may be set to a value equal to or greater than the time period (j) indicated in FIG. 3, and the freedom of setting is increased. Therefore, the timing of switching from step 1 to step 2 does not require high-speed processing using a high-performance control IC.

Effect 2

After the energy charged in the first power storage element 3 has been divided to the second power storage element 4 in step 1, only the second switch element 22 is switched on in step 2, and therefore the energy stored in the second power storage element 4 is discharged, and moreover, by setting the first switch element 21 to an on state in addition to the second switch element 22, in step 3, it is possible to discharge the remaining energy stored in the first power storage element 3. As a result of this, by using an IC of relatively low performance and omitting use of a discharge resistor, and by controlling the on/off switching of a relatively low-speed switch element which is compatible with the performance of this IC, it is possible to prevent the first switch element 21 and the second switch element 22 from breaking down due to exceeding the maximum allowable heat generation amount.

In the first embodiment described above, the explanation is premised on the second power storage element 4 being empty of energy prior to step 1. However, the present invention is not limited to a premise of this kind. When there is energy left in the second power storage element 4, it is possible to empty the energy from the second power storage element 4 by switching the second switch element 22 on before carrying out step 1.

Furthermore, if the amount of energy in the first power storage element 3 is low, than even if the first switch element 21 is switched on in a state where there is energy left in the second power storage element 4, the movement of energy will be smaller than when an arm short-circuit occurs. Consequently, if the amount of energy in the first power storage element 3 is small, then even if there is energy left in the second power storage element 4, there is no problem if control is carried out in accordance with steps 1 to 3 described above.

Furthermore, in the first embodiment described above, the explanation presupposes that the first power storage element 3 and the second power storage element 4 have the same capacity. However, the present invention is not limited to a premise of this kind. The capacity of the second power storage element 4 may be smaller than the capacity of the first power storage element 3. A concrete example thereof is described below.

In FIG. 2, (c) is the total loss of the first switch element 21 when the capacity of the second power storage element 4 is smaller than the capacity of the first power storage element 3 and the amount of charged energy is lower in the second power storage element 4 than in the first power storage element 3. As can be seen from FIG. 2, (c) never exceeds (e), and therefore the first switch element 21 does not break down.

In the first embodiment, if the capacity of the second power storage element 4 is smaller than the capacity of the first power storage element 3, then the second power storage element 4 has a smaller amount of charged energy than the first power storage element 3. Therefore, in one process of step 1, if a portion of the energy charged in the first power storage element 3 cannot be charged to the second power storage element 4 until the potential difference of the first power storage element 3 and the second power storage element 4 reaches equilibrium, then it is necessary to carry out steps 1 and 2 a plurality of times.

The state of the switching unit 2 and the energy charging state of the second power storage element 4 at the time that step 2 ends are similar to the state prior to step 1. Consequently, it is possible to repeat steps 1 and 2 a plurality of times, and the energy stored in the first power storage element 3 can be discharged while gradually being moved to the second power storage element.

In this way, even in cases where the current passing through the switching unit 2 is large, the energy stored in the first power storage element 3 in order to smoothen the power source variations is large, and the capacity of the second power storage element 4 is smaller than the capacity of the first power storage element 3, it is possible to prevent the first switch element 21 and the second switch element 22 from breaking down due to exceeding the maximum allowable heat generation amount, by repeating steps 1 and 2. In other words, similarly to a case where the capacity of the first power storage element 3 and the second power storage element 4 are the same, it is possible to achieve a discharge device which employs a switch element of relatively low speed which is controlled by an IC having relatively low performance, and without using a discharge resistor.

Moreover, in the first embodiment described above, a case where a discharge resistor is not used was described, but the present invention can also be configured by connecting a discharge resistor in series with the second power storage element 4. A concrete example thereof is described below.

Figure 4:
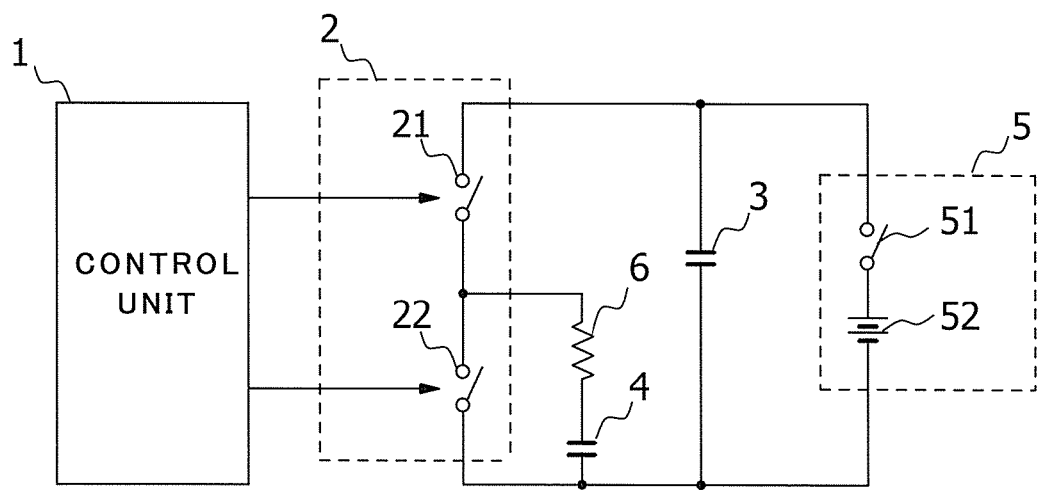
FIG. 4 is a circuit diagram showing a further example of a discharge device relating to a first embodiment of the present invention.

FIG. 4 is a circuit diagram showing a further example of a discharge device relating to a first embodiment of the present invention. When compared with the configuration illustrated previously in FIG. 1, the configuration shown in FIG. 4 differs in further comprising a discharge resistor 6 which is connected in series with the second power storage element 4. The series circuit comprising the second power storage element 4 and the discharge resistor 6 is connected in parallel with the second switch element 22. Therefore, the description given below centers on the behavior of the discharge resistor 6, which is the different feature.

Figure 5:
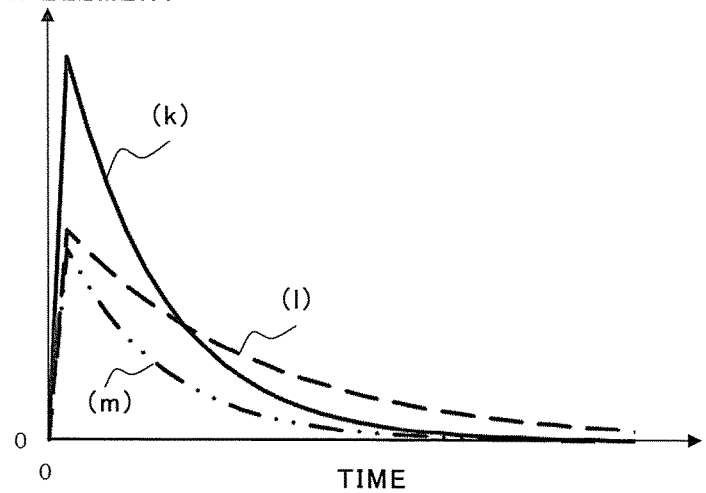
FIG. 5 is a diagram showing a time response waveform of the passing current in the first switch element according to the first embodiment of the present invention.

FIG. 5 is a diagram showing a time response waveform of the passing current in the first switch element 21 according to the first embodiment of the present invention. In FIG. 5, the horizontal axis represents time and the vertical axis represents the passing current in the first switch element 21. Furthermore, (k) and (l) shown in FIG. 5 respectively show the following contents. (m) is described below in the second embodiment.
(k) shows the passing current in the first switch element 21 in the configuration shown in FIG. 5 of the first embodiment (in other words, when there is no discharge resistor 6).
(l) shows the passing current in the first switch element 21 in the configuration shown in FIG. 5 of the first embodiment (in other words, when there is a discharge resistor 6).

It can be seen that the current at the start of discharge (inrush current) is smaller in the case of (l) than in the case of (k).

In FIG. 5, the passing current in the first switch element 21 is shown in a case where power is charged from the first power storage element to the second power storage element 4 via the first switch element 21 and the discharge resistor 6, but similar beneficial effects can be obtained by the discharge resistor 6 in respect of the passing current in the second switch element 22, when the power is charged from the second power storage element 4 via the discharge resistor 6 and the second switch element 22.

Furthermore, by using a discharge resistor 6, the energy received by the switching unit 2 is the total energy in the configuration in FIG. 1 which does not use a discharge resistor 6, minus the loss due to thermal energy created by heat generation in the discharge resistor 6. Consequently, the switching unit 2 in the configuration in FIG. 4 can use a switch element having lower current tolerance than the configuration in FIG. 1.

Furthermore, in Patent Document 1, the discharge resistor 6 is connected in parallel with the first power storage element 3, and the energy charged in the first power storage element 3 is discharged via the discharge resistor 6. On the other hand, in the configuration in FIG. 4 of the first embodiment of the present invention, the discharge resistor 6 is connected in parallel with the second power storage element 4, and the energy charged in the second power storage element 4 is discharged via the discharge resistor 6.

The energy charged in the power storage element 4 is less than the energy charged in the first power storage element 3. Therefore, compared with a case where the discharge resistor 6 is connected in parallel with the first power storage element 3, as in Patent Document 1, the discharge resistor 6 in the configuration in FIG. 4 enables compactification of the heat radiator.

Furthermore, the circuit configuration in which the discharge resistor 6 is connected in series with the second power storage element 4, as shown in FIG. 4, is a snubber circuit. Therefore, a beneficial effect is obtained in that the switching noise of the second switch element 22 is reduced during normal switching operations.

In this way, even in cases where the current passing through the switching unit 2 is large, the energy stored in the first power storage element 3 in order to smoothen the power source variations is large, and the discharge resistor 6 is connected in series to the second power storage element 4, it is still possible to prevent the first switch element 21 and the second switch element 22 from breaking down due to exceeding the maximum allowable heat generation amount, by repeating steps 1 to 3. Furthermore, by providing the discharge resistor 6, it is possible to reduce the inrush current to the first switch element 21, and the heat radiator in the discharge resistor 6 can also be made more compact in size.

The inrush current is a sudden change in the current. Induction elements, meanwhile, have an effect of suppressing sudden changes in the current. Therefore, in cases where an induction element is used instead of the discharge resistor 6, an effect is obtained in that the inrush current to the first switch element 21 can be made smaller than (k) in FIG. 5 indicated above. Similarly, in respect of the passing current in the second switch element 22, a similar beneficial effect to when using the discharge resistor 6 is obtained, by using an induction element.

Furthermore, due to iron loss and copper loss, the induction element loses energy during charging and discharging of the second power storage element 4, similarly to when using the discharge resistor 6. By using an induction element, the energy received by the switching unit 2 is the total energy in the configuration of FIG. 1 which does not use an induction element, minus the iron loss and copper loss produced by the induction element. Consequently, the switching unit 2 in the configuration in FIG. 4 which uses an induction element connected in series with the second power storage element 4 can use a switch element having lower current tolerance than the configuration in FIG. 1.

Moreover, a series circuit in which both a discharge resistor and an induction element are connected in series to the second power storage element 4 may be connected in parallel with the second switch element 22. A configuration which uses both a discharge resistor and an induction element, connected in series, will yield similar beneficial effects to when using only an induction element only, due to the increased copper loss of the induction element.

Second Embodiment

Figure 6:
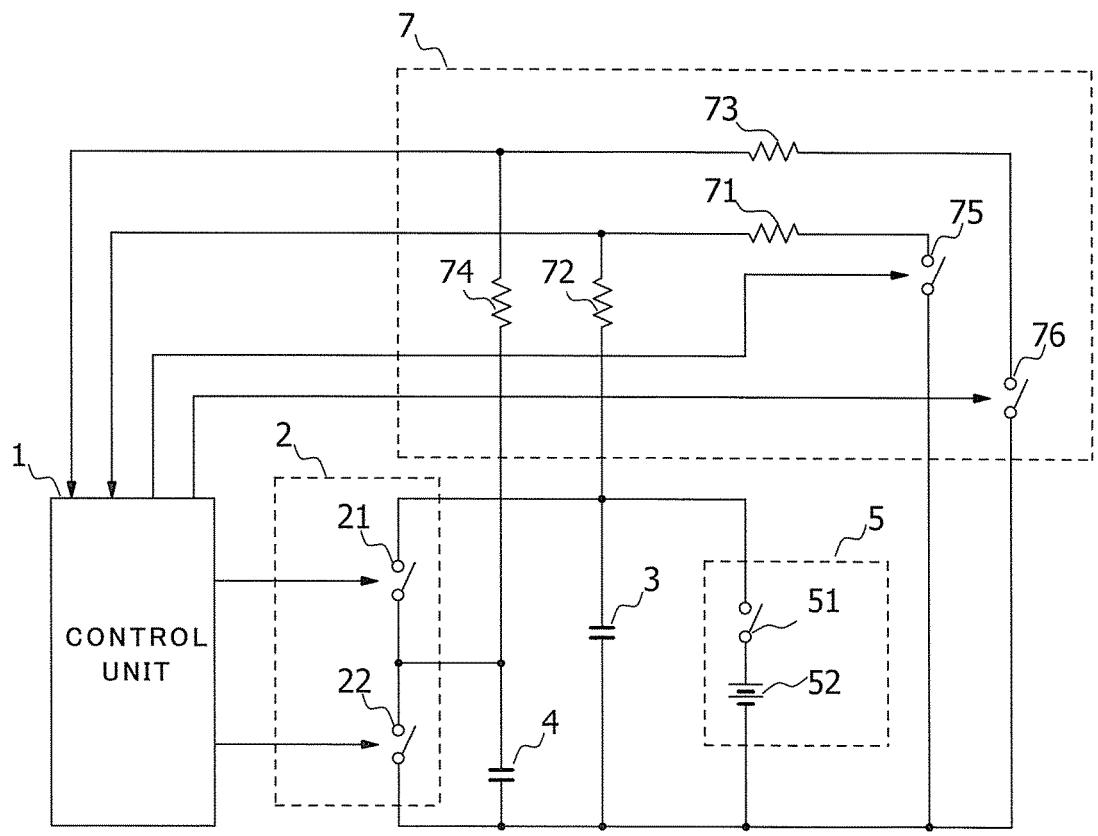
FIG. 6 is a circuit diagram showing an example of a discharge device relating to a second embodiment of the present invention.

Next, a discharge device according to a second embodiment of the present invention will be described. FIG. 6 is a circuit diagram showing an example of a discharge device relating to a second embodiment of the present invention. When compared with the configuration shown in FIG. 1 of the first embodiment, the configuration shown in FIG. 6 of the second embodiment differs in further comprising a voltage detection unit 7. Therefore, the description given below centers on the behavior of the voltage detection unit 7, which is the point of difference.

The voltage detection unit 7 in the second embodiment is configured by voltage-dividing resistors 71 to 74, and switch elements 75 and 76. The voltage-dividing resistors 71 and 72 are connected between the power storage element 3 and the switch element 75, and the control unit 1 detects the voltage in the power storage element 3, by reading in the voltage that has been divided by the voltage-dividing resistors 71 and 72.

On the other hand, the voltage-dividing resistors 73 and 74 are connected between the power storage element 4 and the switch element 76, and the control unit 1 detects the voltage in the power storage element 4, by reading in the voltage that has been divided by the voltage-dividing resistors 73 and 74. The control unit 1 is configured so as able to control the switching of the switch elements 75 and 76.

Here, the following state is presupposed.

The first power storage element 3 has been charged with energy by the power source device 5, and is disconnected from the positive terminal of the power source 52 by the switch element 51.

Furthermore, the voltage of the second power storage element 4 is an arbitrary voltage lower than the voltage of the first power storage element 3, and the energy charged in the second power storage element 4 is lower than the energy charged in the first power storage element 3.

Moreover, the switching unit 2 has received a control signal from the control unit 1 and the first switch element 21 is off and the second switch element 22 is off.

The discharge device of the second embodiment executes a discharge process by steps 1 to 3 indicated below, from the presumed state of this kind.

(Step 1)

Firstly, the voltage detection unit 7 turns on the switch elements 75 and 76, by receiving a control signal from the control unit 1. As a result of this, the control unit 1 detects the voltage of the first power storage element 3 by using the voltage-dividing resistors 71 and 72, and detects the voltage of the second power storage element 4 by using the voltage-dividing resistors 73 and 74.

(Step 2)

The control unit 1 compares the voltages of the first power storage element 3 and the second power storage element 4, on the basis of the voltage detection result. Here, it is presupposed that the voltage of the second power storage element 4 is an arbitrary voltage lower than the voltage of the first power storage element 3. However, the control unit 1 may, if the voltage of the power storage element 4 reaches the maximum rated voltage of the power storage element 3, turn on the switch element 76 and lower the voltage of the second power storage element 4 to the maximum rated voltage of the first power storage element 3. Furthermore, the control unit 1 carries out step 4, when the voltage of the second power storage element 4 is the same as the voltage of the first power storage element 3.

(Step 3)

The switching unit 2 receives a control signal from the control unit 1, and switches the first switch element 21 from off to on, and the second switch element 22 from on to off. As a result of this, the first power storage element 3 and the second power storage element 4 are connected in series via the first switch element 21.

In this case, the voltage of the second power storage element 4 is lower than the maximum rated voltage of the first power storage element 3, and the energy charged in the second power storage element 4 is lower than the energy charged in the first power storage element 3. Therefore, the energy charged in the first power storage element 3 is charged to the second power storage element 4, in accordance with the potential difference with respect to the second power storage element 4.

In other words, a portion of the energy charged in the first power storage element 3 is charged to the second power storage element 4, until the potential difference between the first power storage element 3 and the second power storage element 4 reaches equilibrium. The first power storage element 3 and the second power storage element 4 have the same capacity, and therefore when there is no potential difference therebetween, the same energy is charged in the first power storage element 3 and the second power storage element 4.

Consequently, of the energy that was originally charged in the first power storage element 3, half of the energy corresponding to the potential difference remains in the first power storage element 3, and of the remaining energy, half of the energy corresponding to the potential difference is charged to the second power storage element 4.

In actual practice, there is loss due to the on resistance of the first switch element 21, and the energy divided between the first power storage element 3 and the second power storage element 4 is the energy corresponding to the potential difference, of the energy originally charged in the first power storage element 3, minus the thermal energy generated by the on resistance of the first switch element 21. In other words, the sum of the energy charged in the first power storage element 3 and the second power storage element 4 is smaller than the energy that was charged in the first power storage element 3 originally, prior to step 1.

(Step 4)

Thereupon, the switching unit 2 receives a control signal from the control unit 1, and switches the first switch element 21 from on to off, and the second switch element 22 from off to on. As a result of this, the first power storage element 3 and the second power storage element 4 are disconnected, and the second power storage element 4 is shorted via the second switch element 22.

In this case, the control unit 1 detects the voltage of the first power storage element 3 by using the voltage-dividing resistors 71 and 72, and detects the voltage of the second power storage element 4 by using the voltage-dividing resistors 73 and 74. The control unit 1 keeps the second switch element 22 on until the voltage of the first power storage element 3 and the voltage of the second power storage element 4 reach an arbitrary potential difference, and then switches the second switch element 22 from on to off, when the voltages have reached the arbitrary potential difference. As a result of this, a portion of the energy charged in the second power storage element 4 is discharged. In other words, the voltage charged in the second power storage element 4 (namely, a further portion of the portion of energy charged in the first power storage element 3) is discharged.

By subsequently repeating steps 3 and 4, the energy charged in the first power storage element 3 is divided into energy that is charged to the second power storage element 4, and the energy charged in the second power storage element 4 can be discharged.

Here, the total loss in the first switch element 21 will be described.

(d) in FIG. 2 shown in the first embodiment is the total loss of the first switch element 21 when the voltage of the second power storage element 4 in the second embodiment is controlled to an arbitrary voltage lower than the maximum rated voltage of the first power storage element 3. As can be seen from FIG. 2, (d) never exceeds (e), and therefore the first switch element 21 does not break down.

Furthermore, (m) in FIG. 5 shown in the first embodiment indicates the passing current in the first switch element 21 when the voltage of the second power storage element 4 in the second embodiment is controlled to an arbitrary voltage lower than the voltage of the first power storage element 3. It can be seen that the current at the start of discharge (inrush current) is smaller in the case of (m) than in the case of (k). Consequently, the switching unit 2 in the configuration in FIG. 6 can use a switch element having lower current tolerance than the configuration in FIG. 1 of the first embodiment.

In this way, if the current passing through the switching unit 2 is large and the energy stored in the first power storage element 3 in order to smoothen the power source variations is large, then since the configuration includes a voltage detection unit 7, a discharge process is carried out on the basis of controlling the switching of the switch elements in accordance with steps 1 to 4. Consequently, it is possible to use an IC of relatively low performance and to control the on/off switching of a relatively low-speed switch element which is compatible with the performance of this IC.

As a result of this, the inrush current to the first switch element 21 and the second switch element 22 can be reduced, and it is possible to achieve a discharge current that prevents the first switch element 21 and the second switch element 22 from breaking down due to exceeding the maximum allowable heat generation amount, by an inexpensive configuration, and without requiring the use of a discharge resistor.

Third Embodiment

Figure 7:
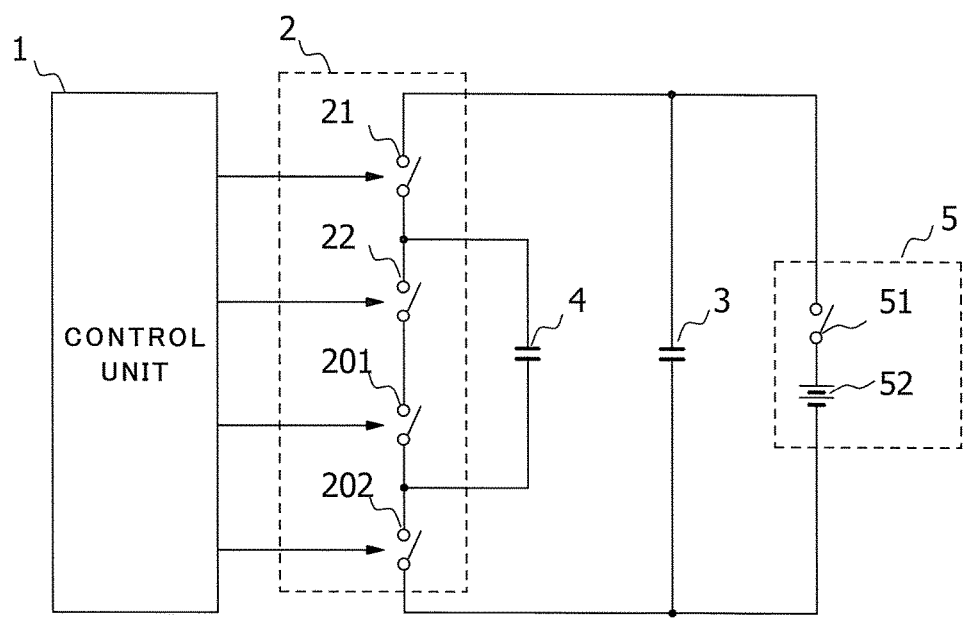
FIG. 7 is a circuit diagram showing an example of a discharge device relating to a third embodiment of the present invention.

Next, in the third embodiment, a case where the discharge device of the present invention is applied to a multi-level chopper circuit will be described. FIG. 7 is a circuit diagram showing an example of a discharge device relating to a third embodiment of the present invention. When compared with the configuration shown in FIG. 1 of the first embodiment, the configuration shown in FIG. 7 differs in respect of the composition of the switching unit 2. In FIG. 7, reference numeral 2 indicates the switching unit 2 according to the third embodiment. Therefore, the description given below centers on the configuration and behavior of the switching unit 2, which is the point of difference.

The switching unit 2 in the third embodiment is configured by including a third switch element 201 and a fourth switch element 202, in addition to the first switch element 21 and the second switch element 22, and the four switch elements are connected in series in this order. The second power storage element 4 is connected in parallel with the series circuit of the second switch element 22 and the third switch element 201, and has the same capacity as the first power storage element 3.

In a circuit configuration of this kind, the following state is presupposed.

The first power storage element 3 has been charged with energy by the power source device 5, and is disconnected from the positive terminal of the power source 52 by the switch element 51.

The second power storage element 4 is empty of energy.

The switching unit 2 has received a control signal from the control unit 1 and the first switch element 21 is switched off and the second switch element 22 is switched on, and furthermore the third switch element 201 and the fourth switch element 202 are on.

When steps 1 to 3 similar to the first embodiment are carried out, the energy charged in the first power storage element 3 is divided into energy charged to the second power storage element 4, and can be discharged.

Here, the multi-level chopper circuit has the configuration disclosed in Patent Document 2. Therefore, the circuit configuration shown in FIG. 7 of the third embodiment can adopt the same circuit configuration as the multi-level chopper circuit disclosed in Patent Document 2, and can perform discharge without adding a circuit to the multi-level chopper circuit.

Consequently, according to the third embodiment, by using the circuit configuration shown in FIG. 7 according to the present invention, it is possible to impart the discharge process function of the present invention, without adding a circuit to the multi-level chopper circuit.

Fourth Embodiment

Figure 8:
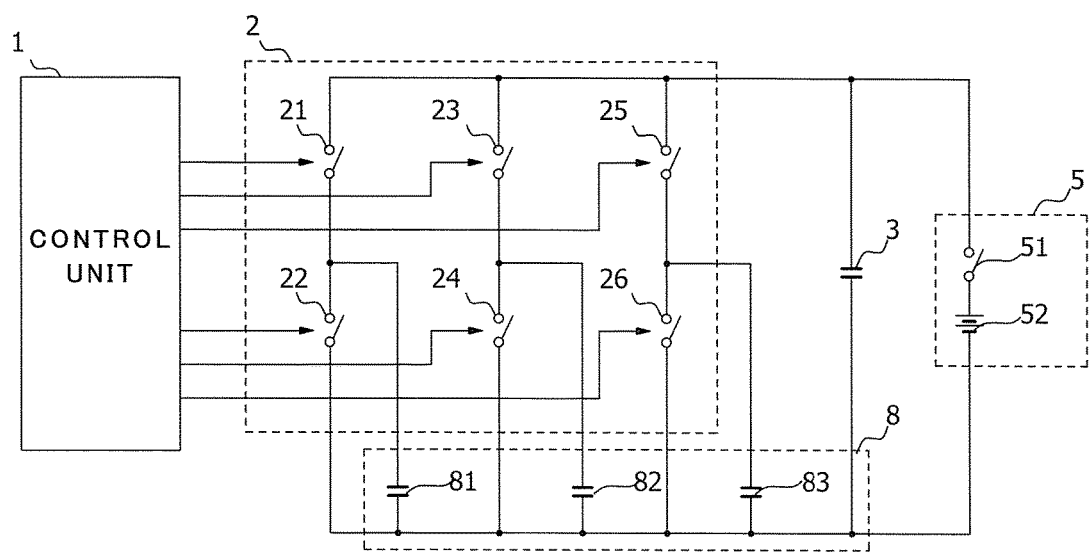
FIG. 8 is a circuit diagram showing an example of a discharge device relating to a fourth embodiment of the present invention.

Next, a discharge device according to a fourth embodiment of the present invention will be described. FIG. 8 is a circuit diagram showing an example of a discharge device relating to a fourth embodiment of the present invention. When compared with the configuration shown in FIG. 1 of the first embodiment, the configuration shown in FIG. 8 of the fourth embodiment differs in that the switching unit 2 and the power storage unit 8 (corresponding to the second power storage element) are configured by a three-stage parallel circuit. In FIG. 8, reference numeral 2 indicates the switching unit 2 according to a fourth embodiment, and reference numeral 8 indicates the power storage unit 8 according to the fourth embodiment, which comprises second power storage elements 81 to 83 arranged in three parallel lines.

In the switching unit 2 according to the fourth embodiment, the first switch element 21 and the second switch element 22 are connected in series, the first switch element 23 and the second switch element 24 are connected in series, and the first switch element 25 and the second switch element 26 are connected in series, and these three serially connected circuits are connected together in parallel.

Furthermore, the power storage unit 8 which corresponds to a second power storage element in the fourth embodiment, is configured by three second power storage elements 81 to 83 which are connected in parallel, and each of the three second power storage elements 81 to 83 has a capacity of ⅓ that of the first power storage element 3. The second power storage element 81 is connected in parallel with the second switch element 22, the second power storage element 82 is connected in parallel with the second switch element 24, and the second power storage element 83 is connected in parallel with the second switch element 26.

In other words, the configuration shown in FIG. 8 of the fourth embodiment corresponds to a case where three of the circuit portions comprising the switching unit 2 and the second power storage element 4 in the configuration shown in FIG. 1 of the first embodiment are connected in parallel.

In the circuit configuration of this kind, a state of the following kind is presupposed, similarly to the first embodiment.

The first power storage element 3 has been charged with energy by the power source device 5, and is disconnected from the positive terminal of the power source 52 by the switch element 51.

The three second power storage elements 81 to 83 constituting the power storage unit 8 are all empty of energy.

The switching unit 2 has received a control signal from the control unit 1 and the first switch elements 21, 23, 25 are off and the second switch elements 22, 24, 26 are on.

The discharge device of the fourth embodiment executes a discharge process by steps 1 to 3 indicated below, from the presumed state of this kind.

(Step 1)

Similarly to the first embodiment, the switching unit 2 receives a control signal from the control unit 1, and switches the first switch elements 21, 23, 25 from off to on, and the second switch elements 22, 24, 26 from on to off. As a result of this, the first power storage element 3 and the power storage unit 8 constituted by the three second power storage elements 81 to 83 connected in parallel are connected in series via the first switch elements 21, 23, 25.

In this case, similarly to the first embodiment, since the energy charged in the power storage unit 8 is empty, then the energy charged in the first power storage element 3 is charged to the power storage unit 8, in accordance with the empty capacity of the power storage unit 8. In other words, a portion of the energy which has been charged to the first power storage element 3 is charged to the power storage unit 8, in order that the energy of the first power storage element 3 and the power storage unit 8 becomes equal. In this case, the energy charged in the first power storage element 3 and the power storage unit 8 is smaller than the energy that was charged in the first power storage element 3 prior to step 1.

(Step 2)

Thereupon, similarly to the first embodiment, the switching unit 2 receives a control signal from the control unit 1, and switches the first switch elements 21, 23, 25 from on to off, and the second switch elements 22, 24, 26 from off to on. As a result of this, the first power storage element 3 and the power storage unit 8 are disconnected, and the power storage unit 8 is shorted via the second switch elements 22, 24, 26.

In this case, similarly to the first embodiment, the energy charged in the power storage unit 8 is discharged. In other words, energy of a quantity less than the energy charged in the first power storage element 3 prior to step 1 is discharged from the power storage unit 8.

(Step 3)

Next, similarly to the first embodiment, the switching unit 2 receives a control signal from the control unit 1, and switches the first switch elements 21, 23, 25 from off to on.

As a result of this, the first power storage element 3 and the power storage unit 8 are both shorted.

In this case, similarly to the first embodiment, the energy charged in the first power storage element 3 is discharged. In other words, energy of a quantity less than the energy charged in the first power storage element 3 prior to step 1 is discharged from the first power storage element 3.

Similarly to the first embodiment, by repeating steps 1 and 2, the energy charged in the first power storage element 3 is divided into energy that is charged to the power storage unit 8, and the energy charged in the power storage unit 8 can be discharged.

When the energy moved from the first power storage element 3 to the power storage unit 8 in the fourth embodiment and the energy moved from the first power storage element 3 to the second power storage element 4 in the first embodiment are the same, then the capacity of the second power storage element 4 in the first embodiment and the sum total of the capacities of the three second power storage elements 81 to 83 constituting the power storage unit 8 in the fourth embodiment should be the same. Therefore, the respective capacities of the second power storage elements 81 to 83 should be one third of the capacity of the second power storage element 4 in the first embodiment.

Moreover, the switching unit 2 according to the fourth embodiment is an inverter circuit configuration. Therefore, power can be discharged by adopting a configuration in which the second power storage element 4 shown in FIG. 8 of the fourth embodiment is connected to an inverter circuit.

In addition, in the configuration of the switching unit 2 and the power storage unit 8 in the fourth embodiment, the same circuit configuration is connected in parallel three times. Therefore, even if one circuit breaks down, discharge can be performed via the remaining circuits.

In this way, according to the fourth embodiment, if the current passing through the switching unit 2 is large and the energy stored in the first power storage element in order to smoothen the power source variations is large, then since a configuration is adopted in which three circuits, each comprising a switching unit and a second power storage element, are connected in parallel, a discharge process is carried out on the basis of switching control of the switch elements in accordance with steps 1 to 3. Consequently, it is possible to use an IC of relatively low performance and to control the on/off switching of a relatively low-speed switch element which is compatible with the performance of this IC.

As a result of this, the inrush current to the first switch element and the second switch element can be reduced, and it is possible to achieve a discharge current that prevents the first switch element and the second switch element from breaking down due to exceeding the maximum allowable heat generation amount, by an inexpensive configuration, and without requiring the use of a discharge resistor. Moreover, the circuit configuration according to the fourth embodiment is a configuration in which a power storage unit having three second power storage elements connected in parallel is added to an inverter circuit, and it is possible to obtain a discharge device that is capable of discharging power by the remaining circuits, even if one circuit breaks down.

As described above, the first to fourth embodiments of the present invention can be combined freely within the scope of the invention, or the embodiments may be modified or omitted, as appropriate.

The invention claimed is:

1. A discharge device, comprising:
a switching unit configured including a first switch element and a second switch element which are connected in series;
a first power storage element connected in parallel with both ends of the switching unit in which the first switch element and the second switch element are connected in series;
a second power storage element connected in parallel with both ends of the second switch element, which is a portion of the switching unit; and
a control unit controlling on/off switching of the first switch element and the second switch element,
the discharge device discharging energy charged in the first power storage element, wherein
the control unit controls on/off switching of the first switch element and the second switch element, in such a manner that a portion of the energy charged in the first power storage element is charged and discharged at least once by the second power storage element, and the energy charged in the first power storage element is discharged while being consumed by one or all of the first switch element and the second switch element, so as to execute the following steps in sequence,
a first step, where the energy charged in the first power storage element is divided into energy that is charged to the second power storage element,
a second step, where the energy charged to the second power storage element by executing the first step is discharged, and
a third step, where the energy charged in the first power storage element after executing the second step is discharged.

2. The discharge device according to claim 1, comprising a configuration in which a plurality of basic circuits, each configured by the first switch element, the second switch element, and a second power storage element connected in parallel with both ends of the second switch element, are connected in parallel, wherein
the control unit, by controlling the on/off switching of the first switch element and the second switch element included in at least one of the plurality of basic circuits which are connected in parallel, causes a portion of the energy charged in the first power storage element to be charged and discharged at least once by the second power storage element in the basic circuit for controlling the on/off switching, and causes the energy charged in the first power storage element to be discharged while being consumed in a portion or all of the first switch element and the second power storage elements in the basic circuit for controlling the on/off switching.

3. The discharge device according to claim 1, wherein
the second power storage element has a smaller capacity than the first power storage element; and
the control unit implements, at least twice, an operation, by executing the first and second steps, of charging and discharging a portion of the energy charged in the first power storage element, by the second power storage element.

4. The discharge device according to claim 1,
wherein the control unit controls the on/off switching of the first switch element and the second switch element in such a manner that, when charging and discharging a portion of the energy charged in the first power storage element, at least once, by the second power storage element, the voltage of the second power storage element becomes an arbitrary voltage that is lower than the voltage of the first power storage element.

5. The discharge device according to claim 1,
further comprising a discharge resistor connected in series with the second power storage element, wherein
a series circuit formed of the second power storage element and the discharge resistor is connected in parallel with both ends of the second switch element; and
the control unit, by controlling the on/off switching of the first switch element and the second switch element, causes the energy charged in the first power storage element to be discharged while being consumed in a portion or all of the discharge resistor, the first switch element and the second switch element.

6. The discharge device according to claim 1,
further comprising an induction element connected in series with the second power storage element, wherein
a series circuit formed of the second power storage element and the induction element is connected in parallel with both ends of the second switch element; and
the control unit, by controlling the on/off switching of the first switch element and the second switch element, causes the energy charged in the first power storage element to be discharged while being consumed in a portion or all of the induction element, the first switch element and the second switch element.

7. The discharge device according to claim 1, further comprising a discharge resistor and an induction element respectively connected in series with the second power storage element, wherein
a series circuit formed of the second power storage element, the discharge resistor and the induction element is connected in parallel with both ends of the second switch element; and
the control unit, by controlling the on/off switching of the first switch element and the second switch element, causes the energy charged in the first power storage element to be discharged while being consumed in a portion or all of the discharge resistor, the induction element, the first switch element and the second switch element.

8. The discharge device according to claim 1,
wherein the switching unit further comprises a third switch element and a fourth switch element and has a configuration in which the first switch element, the second switch element, the third switch element and the fourth switch element are connected in series in order;
the second power storage element is connected in parallel with both ends of a series circuit configured by the second switch element and the third switch element, which are a portion of the switching unit; and
the control unit controls on/off switching of the first switch element, the second switch element, the third switch element and the fourth switch element, in such a manner that a portion of the energy charged in the first power storage element is charged and discharged at least once by the second power storage element, and the energy charged in the first power storage element is discharged while being consumed by a potion or all of the first switch element, the second switch element, the third switch element and the fourth switch element.

9. The discharge device according to claim 2, wherein
the second power storage element has a smaller capacity than the first power storage element; and the control unit implements, at least twice, an operation, by executing the first and second steps, of charging and discharging a portion of the energy charged in the first power storage element, by the second power storage element.

10. The discharge device according to claim 2, wherein the control unit controls the on/off switching of the first switch element and the second switch element in such a manner that, when charging and discharging a portion of the energy charged in the first power storage element, at least once, by the second power storage element, the voltage of the second power storage element becomes an arbitrary voltage that is lower than the voltage of the first power storage element.

11. The discharge device according to claim 2, further comprising a discharge resistor connected in series with the second power storage element, wherein
a series circuit formed of the second power storage element and the discharge resistor is connected in parallel with both ends of the second switch element; and
the control unit, by controlling the on/off switching of the first switch element and the second switch element, causes the energy charged in the first power storage element to be discharged while being consumed in a portion or all of the discharge resistor, the first switch element and the second switch element.

12. The discharge device according to claim 2, further comprising an induction element connected in series with the second power storage element, wherein
a series circuit formed of the second power storage element and the induction element is connected in parallel with both ends of the second switch element; and
the control unit, by controlling the on/off switching of the first switch element and the second switch element, causes the energy charged in the first power storage element to be discharged while being consumed in a portion or all of the induction element, the first switch element and the second switch element.

13. The discharge device according to claim 2, further comprising a discharge resistor and an induction element respectively connected in series with the second power storage element, wherein
a series circuit formed of the second power storage element, the discharge resistor and the induction element is connected in parallel with both ends of the second switch element; and
the control unit, by controlling the on/off switching of the first switch element and the second switch element, causes the energy charged in the first power storage element to be discharged while being consumed in a portion or all of the discharge resistor, the induction element, the first switch element and the second switch element.

14. The discharge device according to claim 2, wherein the switching unit further comprises a third switch element and a fourth switch element and has a configuration in which the first switch element, the second switch element, the third switch element and the fourth switch element are connected in series in order;
the second power storage element is connected in parallel with both ends of a series circuit configured by the second switch element and the third switch element, which are a portion of the switching unit; and
the control unit controls on/off switching of the first switch element, the second switch element, the third switch element and the fourth switch element, in such a manner that a portion of the energy charged in the first power storage element is charged and discharged at least once by the second power storage element, and the energy charged in the first power storage element is discharged while being consumed by a potion or all of the first switch element, the second switch element, the third switch element and the fourth switch element.

* * * * *